United States Patent
Natanzon et al.

(10) Patent No.: US 10,824,375 B1
(45) Date of Patent: Nov. 3, 2020

(54) CLOUD-BASED SNAPSHOTS WITH COARSE AND FINE GRANULARITY MAPS FOR CHANGED DATA

(71) Applicant: EMC IP Holding Company LLC, Hopkinton, MA (US)

(72) Inventors: Assaf Natanzon, Tel Aviv (IL); Ran Goldschmidt, Herzeliya (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 275 days.

(21) Appl. No.: 15/795,713

(22) Filed: Oct. 27, 2017

(51) Int. Cl.
*G06F 16/20* (2019.01)
*G06F 3/06* (2006.01)
*G06F 16/11* (2019.01)
*G06F 9/455* (2018.01)

(52) U.S. Cl.
CPC ............ *G06F 3/067* (2013.01); *G06F 3/0604* (2013.01); *G06F 16/128* (2019.01); *G06F 2009/4557* (2013.01)

(58) Field of Classification Search
CPC ....... G06F 3/067; G06F 16/128; G06F 3/0604
See application file for complete search history.

(56) References Cited

U.S. PATENT DOCUMENTS

| 9,195,670 B1* | 11/2015 | Mam ..................... G06F 16/128 |
| 9,489,267 B1 | 11/2016 | Patwardhan et al. |
| 9,619,172 B1 | 4/2017 | Natanzon et al. |
| 9,690,504 B1 | 6/2017 | Natanzon et al. |
| 2018/0039434 A1* | 2/2018 | Balcha .................. G06F 3/0619 |

OTHER PUBLICATIONS

"Advanced backup options for Hyper-V 2012 R2 on Veeam", https://msandbu.wordpress.com/2016/02/01/advanced-backup-options-for-hyper-v-2012-12-on-veeam/ downloaded on Oct. 4, 2017.

* cited by examiner

*Primary Examiner* — Loc Tran
(74) *Attorney, Agent, or Firm* — Ryan, Mason & Lewis, LLP

(57) ABSTRACT

Data protection appliances are provided for the protection of at least one virtual machine. A plurality of snapshots of at least one virtual machine are obtained. Each snapshot comprises (i) production data of the virtual machine, and (ii) a fine granularity data structure for changed data that is maintained in volatile memory and records metadata for input/output (I/O) operations corresponding to changed data. A metadata differential is generated by aggregating, for example, the fine granularity data structures for any time intervals since the prior snapshot that were flushed to a storage volume and included in the prior snapshot. The storage volume is replicated using the metadata differential. The snapshots optionally further comprise a coarse granularity bit map for changed data indicating whether corresponding blocks of data have changed.

20 Claims, 6 Drawing Sheets

CLOUD-BASED SNAPSHOTS WITH COARSE AND FINE GRANULARITY MAPS FOR CHANGED DATA

FIELD

The field relates generally to the replication of virtual machines in a cloud environment.

BACKGROUND

A significant challenge in a cloud environment is the mobility of data. Cloud providers typically provide a mechanism to create a snapshot of a virtual machine, and allow movement of the snapshot within the boundaries of the cloud provider. Moving snapshots between cloud environments, however, is currently inefficient and requires movement of all of the data (rather than just the data that has changed since a prior snapshot). Access to guest networks is also required, which can present configuration and bandwidth challenges.

A need therefore exists for a cloud agnostic data mobility service that employs differential copying without requiring access to guest networks.

SUMMARY

In one embodiment, a method is provided for protection of at least one virtual machine. An exemplary method comprises obtaining, by at least one processing device of a data protection appliance, a plurality of snapshots of the at least one virtual machine, wherein each of the plurality of snapshots comprise (i) production data of the at least one virtual machine, and (ii) a fine granularity data structure for changed data, wherein the fine granularity data structure is maintained in volatile memory and records metadata for input/output (I/O) operations corresponding to the changed data, and wherein the data protection appliance is external to a production network comprising the virtual machine; generating a metadata differential, by the at least one processing device of the data protection appliance, by aggregating the fine granularity data structures for any time intervals since the prior snapshot that were flushed to at least one storage volume and included in the prior snapshot; and replicating the at least one storage volume using the metadata differential.

In some embodiments, each of the plurality of snapshots further comprise a coarse granularity bit map for changed data indicating whether corresponding blocks of data have changed and wherein the generating step further comprises the step of aggregating the coarse granularity bit maps since a prior snapshot. The coarse granularity bit map and the fine granularity data structure are optionally generated by a Change Block Tracking driver executing on a guest operating system on the production network.

Other illustrative embodiments include, without limitation, apparatus, systems, methods and computer program products comprising processor-readable storage media.

DETAILED DESCRIPTION

Figure 1:
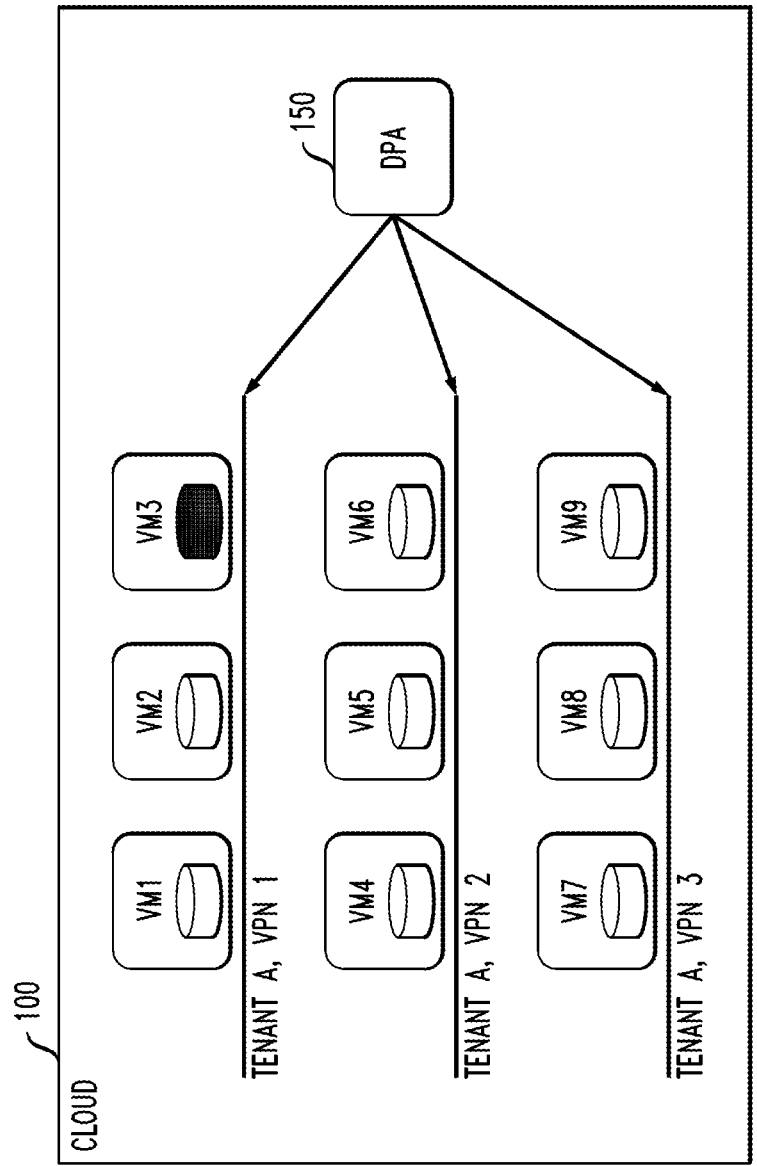
FIG. 1 illustrates a plurality of virtual machines of a given tenant executing in a typical cloud environment.

Illustrative embodiments of the present disclosure will be described herein with reference to exemplary communication, storage and processing devices. It is to be appreciated, however, that the disclosure is not restricted to use with the particular illustrative configurations shown. Aspects of the disclosure provide methods and apparatus for protecting virtual machines using snapshots.

In one or more embodiments, methods and apparatus are provided for protecting a virtual machine (VM) using snapshots by maintaining a coarse granularity bit map for changed data, and a fine granularity data structure for changed data. The coarse granularity bit map indicates whether corresponding blocks of data have changed, and the fine granularity data structure is maintained in volatile memory and records metadata for input/output (I/O) operations corresponding to the changed data.

In some embodiments, new techniques are provided for leveraging Change Block Tracking (CBT) and snapshots that will allow cloud efficient mobility and backup between different cloud systems using existing cloud interfaces, and without using client guest networking.

Change Block Tracking is a common way to keep track of IOs (input/output operations) in a given storage volume. CBT tracks the IO metadata (e.g., location and size) to know where changes on the storage volume have occurred. When combining a CBT mechanism with volume snapshot technology, the difference between two successive snapshots can be extracted. Using a first (full) snapshot and then differences on successive snapshots is a common way to replicate a storage volume. In most cases, the platform itself supplies the CBT mechanism and if the CBT can be synchronized with the snapshot taken, the CBT can be used for replication.

The Change Block Tracking can run externally to the virtual machine by a virtualization service (e.g., the ESX enterprise-class hypervisor commercially available from VMware, Inc.), or can run internally inside the virtual machine or server (e.g., the EMC Networker™ data backup and recovery service, commercially available from Dell EMC of Hopkinton, Mass.) to make internal backups.

Dell EMC Networker™ data backup and recovery services, for example, provide a mechanism for Change Block Tracking inside the guest OS (operating system). The Networker™ data backup and recovery method includes a driver inside the guest OS that tracks the changes and transmits the changes over the network to the backup server. The need to transmit data over network to the backup servers and connectivity between the change block tracking mechanism is common to all host-based solutions.

In one or more embodiments, cloud agnostic replication is provided by:

1. Using a cloud native snapshot;
2. Using a virtual machine guest-based CBT mechanism; and
3. Providing a data protection product as an appliance or service in the cloud, referred to as a Data Protection Appliance (DPA).

Clouds provide APIs (application programming interfaces) to create a snapshot of a virtual machine defined in the cloud (such snapshots are often called cloud native snapshots). The data of the snapshot is kept in a cloud proprietary format. On the Amazon cloud, for example; the snapshots are kept in S3 (Simple Storage Service) as objects, and the cloud native snapshots can be mounted to any host with the right privileges. Once a snapshot is mounted to a host, the data of the snapshot can be read.

VMs in the cloud are placed on a cloud network that is specific to the cloud account (VPN/VPC/private network). The DPA (e.g., the backup server or a data protection appliance) needs IP access in order to retrieve the CBT information and synchronize the cloud snap timing with CBT.

Analyzing the network configuration of a specific cloud tenant, and deploying DPAs with permissions, IP addresses and ports specific to each private network in the VPC can be complex and error prone tasks, and does not adjust well to changes in the network or to additional networks being added.

FIG. 1 illustrates a plurality of virtual machines of a given tenant executing in a typical cloud environment 100. As shown in FIG. 1, the virtual machines VM1-VM9 (for example) of the given tenant A execute on a number of virtual private networks VPN1-VPN3 (for example).

In order for the Data Protection Appliance 150 to retrieve the CBT information of the virtual machines, the DPA 150 requires IP access to the virtual machines in different VPNs. Connecting multiple VPNs with the DPA creates a security risk, and/or involves complex configurations of multiple private networks, credentials and IP addresses regardless of who initiates these IP connections. Furthermore, cloud network bandwidth restrictions are also a challenge. In some cases, the networks may belong to different tenants making the configuration impossible.

Figure 2:
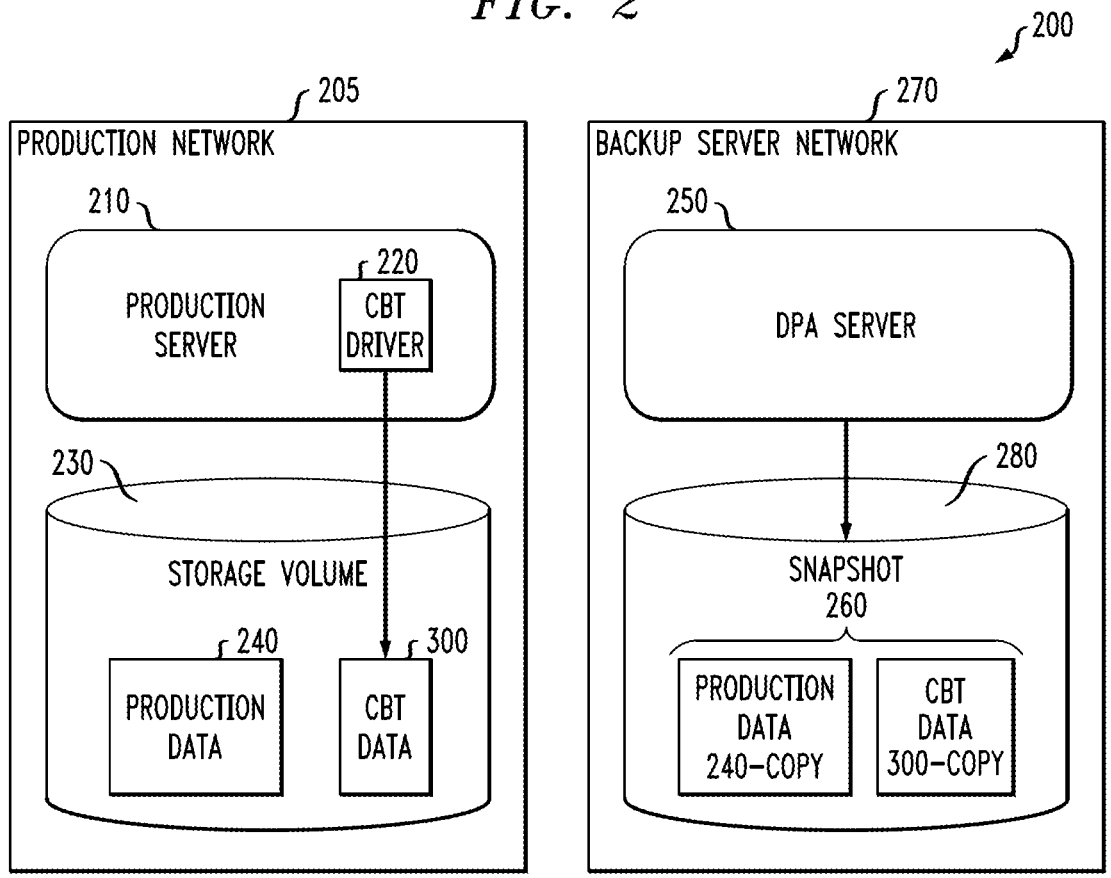
FIG. 2 illustrates a cloud-based snapshot engine, according to one embodiment of the disclosure.

FIG. 2 illustrates a cloud-based snapshot engine 200, according to one embodiment of the disclosure. As shown in FIG. 2, the cloud-based snapshot engine 200 comprises a production server 210 and a DPA server 250. The production server 210 is connected to one or more storage volumes 230 over a production network 205. The production server 210 comprises a CBT driver 220 installed on the guest OS to generate CBT data 300, discussed further below in conjunction with FIG. 3. Generally, the CBT data 300 comprises the coarse granularity bit map and fine granularity data structure for changed data. The CBT data 300 is stored on storage volume 230 along with the production data 240 of the protected volume. The cloud volume snapshot will snap both the production data 240 (volume information) and the CBT data 300 together.

The DPA server 250 is connected to one or more storage volumes 280 over a backup server network 270. As shown in FIG. 2, the DPA server 250 receives a snapshot 260 of the storage volume 230, that includes a copy of the CBT data 300 and a copy of the production data 240. Since a copy of the CBT data 300 is included in the snapshot 260, the DPA server 250 has access to the CBT data generated by the CBT driver 220.

In this manner, the cloud-based snapshot engine 200 employs a guest-based consistent CBT mechanism in the form of CBT driver 220 to efficiently and securely protect the virtual machines, regardless of network configuration/topology and without configurations/credentials/permissions related to the VPNs. To overcome the communication challenges described above, the cloud-based snapshot engine 200 of FIG. 1 does not need network communications between the guest-based CBT driver 220 and the DPA server 250.

As noted above, when combining a CBT mechanism with volume snapshot technology, the difference between two successive snapshots can be extracted. Using a first (full) snapshot and then differences on successive snapshots is a common way to replicate a storage volume. The production data 240 provides the consistent VM snapshot. The snapshot will be created using the cloud standard snapshotting mechanism. Typically, cloud systems store these snaps in an object store (for example, S3 on Amazon). The snapshot can then be retrieved by the DPA server 250 directly, without any relation to the protected VM network configuration.

Among other benefits of the exemplary configuration shown in FIG. 2, the CBT data 300 is transferred to the DPA server 250 without using the guest network that interconnects the virtual machines.

As discussed hereinafter, the manner and the order in which the CBT data 300 is stored ensure both efficiency and consistency.

It is noted that in cloud environments that support cross-volume snapshot consistency in a virtual machine, it is enough to store the CBT information in one of the volumes for all the virtual machine volumes. It is noted that for a single VM with a single virtual volume, the CBT data 300 will be stored on the same volume, and snapshots will include this volume. For a single VM with multiple volumes, the CBT data 300 will be on one of the volumes (comprising all of the CBT data 300 for all of the volumes) or on each volume (each volume for itself). Snapshots will include all volumes of the VM, consistent across volumes. The cloud/DPA/snapshotting mechanisms are responsible for the consistency.

Likewise, for multiple VMs with multiple volumes, the CBT data 300 will be on one of the volumes (comprising all of the CBT data 300 for all volumes) or on each volume (each volume for itself) or on representative volumes (for example, the first volume of each VM). Snapshots will include all volumes of the VMs, consistent across volumes and VMs. The cloud/DPA/snapshotting mechanisms are again responsible for the consistency across VMs.

Generally, the CBT driver 220 will intercept every I/O (input/output) operation on the OS block devices and extract the I/O metadata (e.g., offset and length for each I/O) for recording in the CBT data 300. In other embodiments, changes can be tracked at file level, if required.

Figure 3:
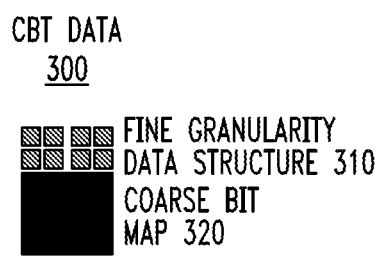
FIG. 3 illustrates the Change Block Tracking (CBT) data of FIG. 2, in further detail, according to an embodiment of the disclosure.

FIG. 3 illustrates the CBT data 300 of FIG. 2, in further detail, according to an embodiment of the disclosure. As shown in FIG. 3, a coarse granularity bit map 320 and a fine granularity data structure 310 are maintained for changed data.

The coarse granularity bit map 320 indicates whether corresponding blocks of data have changed. In the coarse granularity bit map 320, each bit represents a predefined block of data, such as an X MB block of data (for example, the block size can be 32 MBs). The fine granularity data structure is maintained in volatile memory and records metadata for input/output (I/O) operations corresponding to the changed data.

It is noted that the disclosed CBT mechanism can work using only the coarse bit map, at the expense of performance or bandwidth, but using both substantially optimizes the solution.

CBT Data Update Mechanism on I/O

Figure 4:
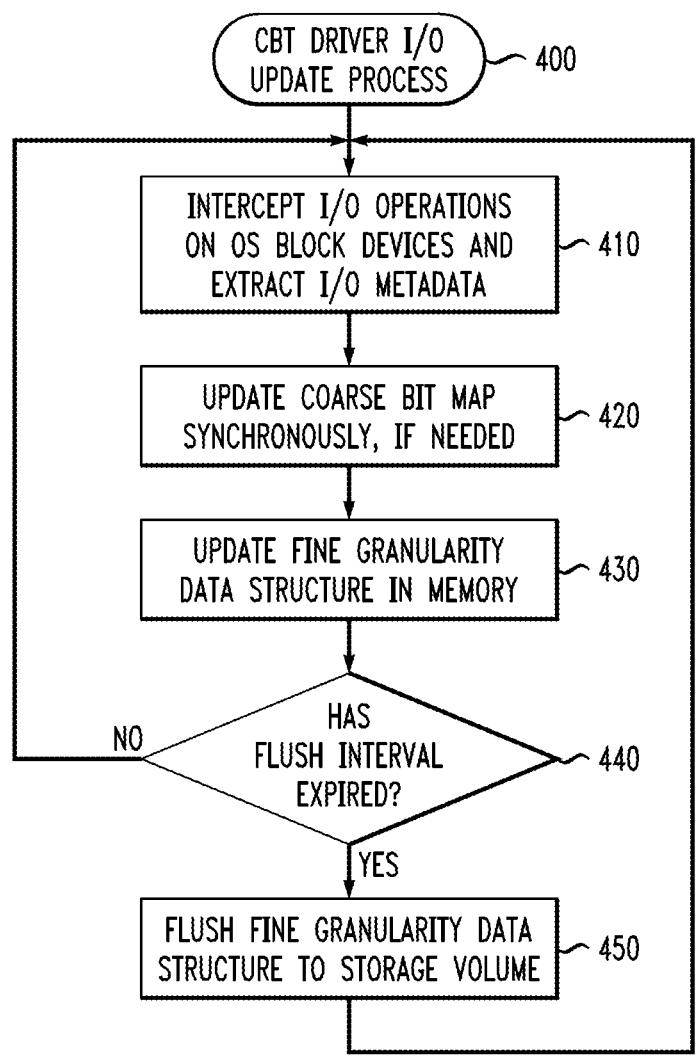
FIG. 4 is a flow chart illustrating an exemplary implementation of a CBT Driver I/O Update Process, according to one embodiment of the disclosure.

FIG. 4 is a flow chart illustrating an exemplary implementation of a CBT Driver I/O Update Process 400, according to one embodiment of the disclosure. As shown in FIG. 4, the exemplary CBT Driver I/O Update Process 400 intercepts I/O operations on OS block devices and extracts I/O metadata during step 410. For each I/O interception, the following exemplary steps are performed.

Before the IO is sent to the underlying storage volume 230, the CBT driver 220 updates the coarse granularity bit map 320 synchronously, during step 420, if it is the first time that this storage block is written to. A write-through cache (or no cache) is required for crash consistency (with little impact on performance, because few updates are needed due to the low map granularity).

Thereafter, the fine granularity data structure 310 is updated in memory during step 430, and the original I/O is released to continue to the storage volume 230.

A test is then performed during step 440 to determine if a predefined flush interval has expired. If it is determined during step 440 that the predefined flush interval has not expired, then program control proceeds to steps 410 to process additional I/O operations.

If, however, it is determined during step 440 that the predefined flush interval has expired, then the fine granularity data structure 310 is flushed to the storage volume 230 during step 450 (and a new fine granularity structure 310 is started), and program control proceeds to step 410, in the manner described above.

The predefined flush interval may be, for example, every Z seconds (where Z can be equal to 30 seconds, for example). In one or more embodiments, a total of N maps may be saved (for example, N equals 60 maps) before the space is reused (e.g., in a cyclic manner). There is optionally also a progress indicator identifying the "active" fine granularity structure 310, so that the location in the cycle can be tracked.

The exemplary CBT Driver I/O Update Process 400 provides coarse CBT resolution on each volume, and fine resolution information is available on each volume up to the previous interval flush cycle (e.g., the fine granularity is not on the volume for the last interval, as it is in memory at the time of the flush operation), as discussed further below in conjunction with FIG. 6.

In addition, based on the stated exemplary parameters of a predefined flush interval of 30 seconds, and up to N=60 maps saved, the CBT data 300 must be provided to the DPA server 250 at least once every 30 minutes, so that the cyclic space will not be overrun. Before the fine granular bit map is flushed, a new coarse granular bit map and a new in-memory fine granular bit map are started and then the old fine granular bit maps are flushed. It is noted that once a fine granular bit map is flushed, the coarse map matching the flushed map can optionally be deleted.

It is noted that the value of the parameters of the coarse bit map resolution, the flush interval and the number of saved maps is a tradeoff of disk pace, performance overhead and snapping frequency, as would be apparent to a person of ordinary skill in the art.

Figure 5:
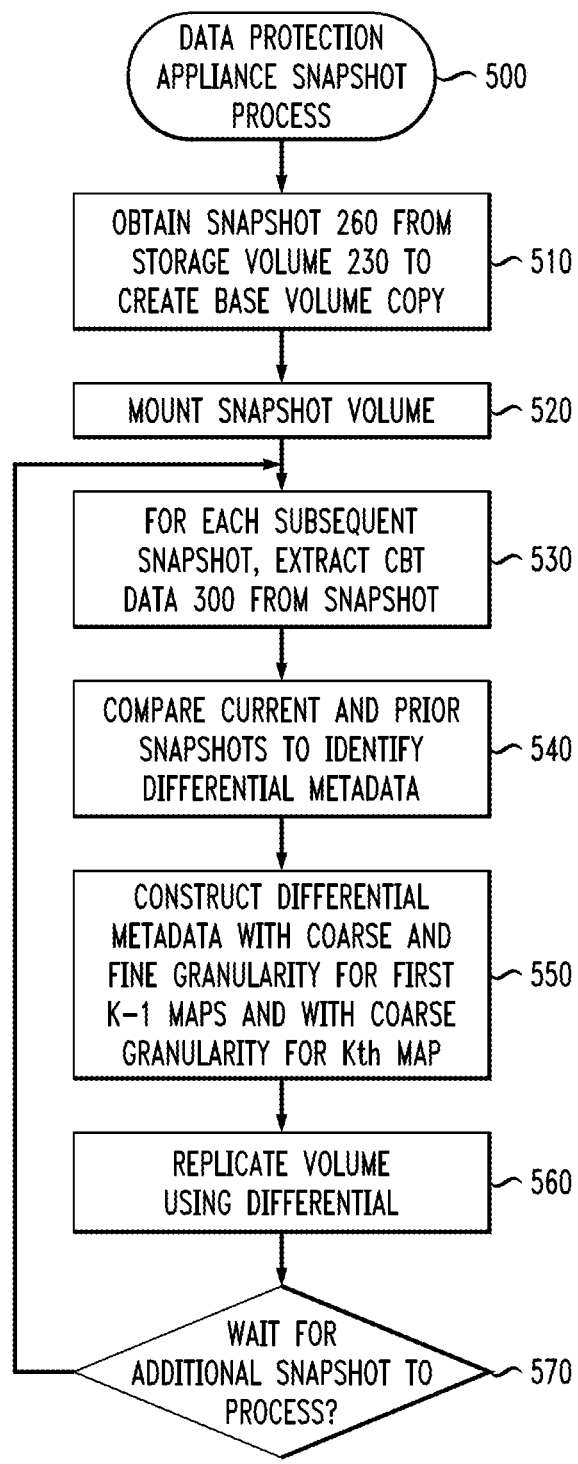
FIG. 5 is a flow chart illustrating an exemplary implementation of a Data Protection Appliance Snapshot Process, according to an embodiment of the disclosure.

FIG. 5 is a flow chart illustrating an exemplary implementation of a Data Protection Appliance Snapshot Process 500, according to one embodiment of the disclosure. As shown in FIG. 5, the Data Protection Appliance Snapshot Process 500 initially obtains a snapshot 260 from the storage volume 230 and uses the snapshot to create a base volume copy during step 510. The snapshot volume is then mounted during step 520. As noted above, DPA server 250 can access the relevant object store directly to obtain the snapshot and mount the snapshot volume.

For each subsequent snapshot, the Data Protection Appliance Snapshot Process 500 extracts the CBT data 300 from the snapshot during step 530, and compares the current and prior snapshots to identify the differential metadata during step 540. Generally, the first snapshot 'A' taken will be sent to the DPA server 250 as is to create the base volume copy (e.g., a full sweep). In one or more embodiments, this is mandatory regardless of technology used. The transfer can be optimized, for example, if silvering was used. See, for example, U.S. Pat. No. 8,060,714, entitled "Initializing Volumes in a Replication System," incorporated by reference herein in its entirety. The comparison can be performed during step 540 by processing the extracted CBT data 300 or by a progress indicator left by the CBT driver 220 on the disk.

The differential metadata is then constructed during step 550 with coarse and fine granularity, as discussed further below in conjunction with FIG. 6. Assume that there are K maps that contain the differential metadata. For the first K−1 maps, there is full coarse and fine granularity information. For the last interval (K), however, there is only accurate coarse information. Thus, the differential metadata is constructed for the first K−1 maps by creating the union of the coarse and fine granularity information.

In one embodiment, interval K is constructed using only the coarse granularity map for interval K (which is sufficient, since the last map was only for a short period of time). With the example numbers above, with snapshots taken every 30 minutes, and fine granularity data flushed every 30 seconds, the interval K (with only the coarse granularity) corresponds to for at most the last 30 seconds, which is less than 2% of the overall time. A further variation is discussed further below in conjunction with FIG. 7. It is again noted that there can be two coarse intervals, as a new coarse interval is started before flushing the fine interval and then the two coarse intervals may be needed since the fine interval may not have completed flushing when the snapshot was taken.

The volume is replicated during step 560 using the differential metadata. Once the CBT differential metadata is calculated, the areas of the storage volume to be transferred is known, and the differential blocks can be read since the prior snapshot and replicated.

A test is then performed during step 570 to determine if an additional snapshot has arrived to process. Once an additional snapshot has arrived to process, program control returns to step 530 and continues in the manner discussed above.

As noted above, in one or more embodiments, there are two levels of differential metadata. The coarse level differential metadata is an up-to-date consistent coarse-level differential. It is substantially guaranteed to be consistent because it is written before the I/Os are stored to the volume.

The fine level differential metadata has been flushed, except for the latest fine level bit map. Thus, the exemplary CBT Driver I/O Update Process 400 provides coarse CBT resolution on each volume, and fine resolution information is available on each volume up to the previous interval flush cycle (e.g., the fine granularity is not stored on the storage volume for the last interval, as it was in memory at the time of the flush operation).

Figure 6:
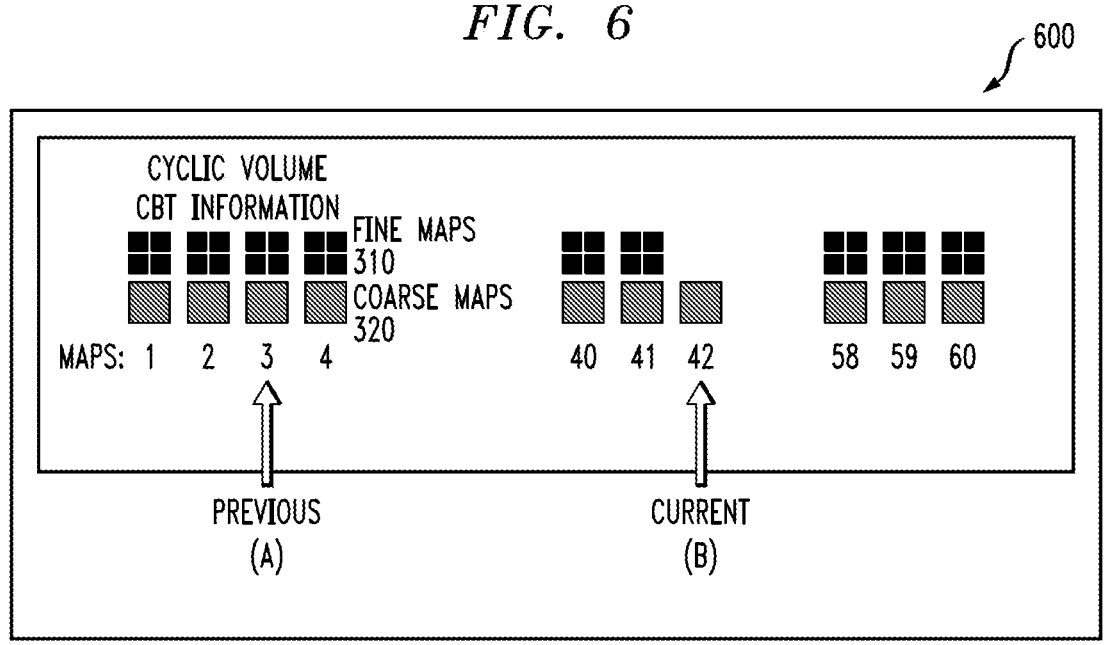
FIG. 6 illustrates an exemplary differential CBT metadata construction process for constructing the differential CBT metadata during the execution of FIG. 5, according to a further embodiment of the disclosure.

FIG. 6 illustrates an exemplary differential CBT metadata construction process 600 for constructing the differential CBT metadata during step 550 of FIG. 5, according to a further embodiment of the disclosure. As shown in FIG. 6, the current snapshot B occurs on CBT map number 42. The previous snapshot occurred on CBT map number 3. There are coarse CBT maps 320 on all maps 4-41, since the last snapshot. There are fine CBT maps 310 for maps 4-41, since the last snapshot. There is no fine CBT map 310 for the final map 42, since the fine CBT map for map 42 was still in memory at the time of the flush operation.

For the first K−1 maps (maps 4-41), there is full coarse and fine granularity information. For the last interval (K=42), however, there is only accurate coarse information at the time of the current snapshot. Thus, the differential metadata is constructed for the first K−1 maps by creating the union of the fine granularity information. In the embodiment of FIG. 6, interval K=42 is constructed using only the coarse CBT map 320 for interval K (which is sufficient, since the last map was only for a short period of time).

Figure 7:
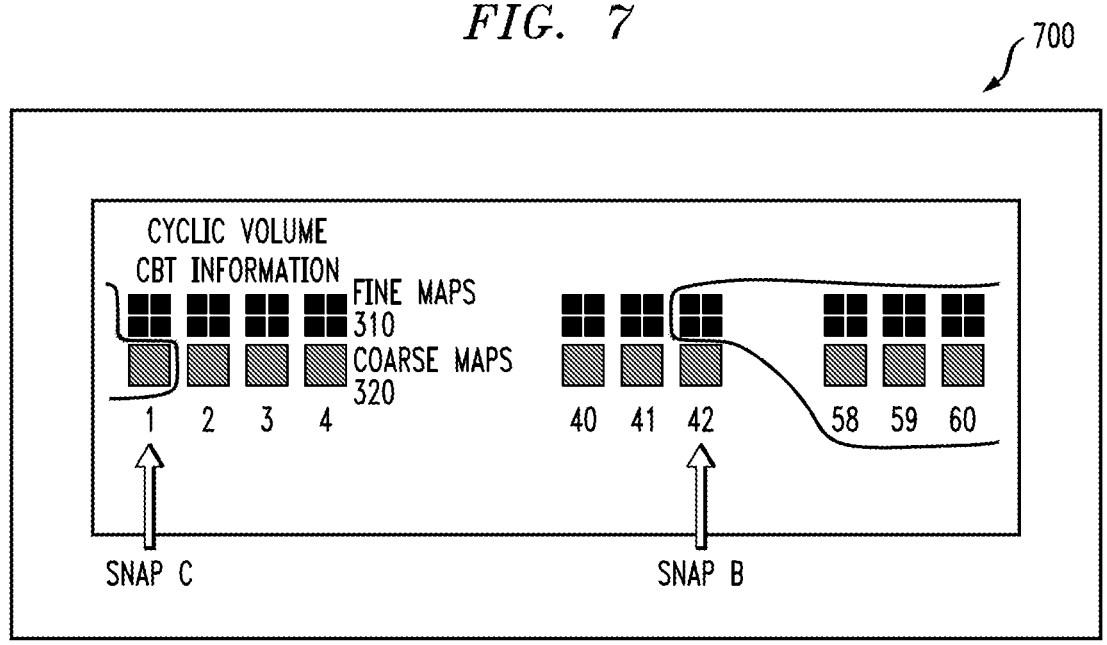
FIG. 7 illustrates an exemplary alternative differential CBT metadata construction process, according to a further embodiment of the disclosure.

FIG. 7 illustrates an exemplary alternative differential CBT metadata construction process 700 for constructing the differential CBT metadata for interval K (FIG. 5, step 550), according to a further embodiment of the disclosure. Generally, the alternative differential CBT metadata construction process 700 waits to complete this last interval differential calculation until the next snapshot, which will include the flushed fine CBT data for interval K, as shown in FIG. 7.

As shown in FIG. 7, the next snapshot 'C' (within the circular lines at the two ends of FIG. 7) includes the fine CBT map 310 of interval K of the last map 42 on snapshot B. This is the fine information that did not appear in the previous snapshot B, as discussed above in conjunction with FIG. 6. This information can now be used to get the fine CBT map 310 for the last map of data (interval K=42) for snapshot B and be sure that any 10 on it was not missed. This data is then transferred for the replication and snapshot B can be deleted. Now, snapshot C is used as the base snap and continued as described above.

There may be some overlap of CBT information between snapshots B and C, as the exact timing of the snapshot is not known to the CBT mechanism. Therefore, some redundant data may potentially be sent again in snapshot C to ensure consistency. If the two snapshot mechanism is used (e.g., using snapshot B as the data snapshot and obtain the metadata differential from snapshot C as well), the coarse granular data is no longer needed and only the fine grained metadata can be used, which is flushed asynchronously, thus has even less impact on the production system.

Application consistency can optionally be created by quiescing the application before taking the snapshot. The underlying CBT mechanism is agnostic to the quiesce operation but ensures that it covers all of the relevant data. Therefore, the resulting snapshot that is transferred will be ensured to be application consistent. It is noted that, in one or more embodiments, when the technique illustrated in FIG. 7 is used, there is no need for the coarse granular bitmap and no data needs to be flushed synchronously to slow down the application.

CONCLUSION

One or more embodiments of the disclosure provide improved methods and apparatus for protecting virtual machines using snapshots and differential metadata. The foregoing applications and associated embodiments should be considered as illustrative only, and numerous other embodiments can be configured using the techniques disclosed herein, in a wide variety of different applications.

It should also be understood that the disclosed techniques for protecting virtual machines, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for protecting virtual machines may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based snapshot engine 200, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based snapshot platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
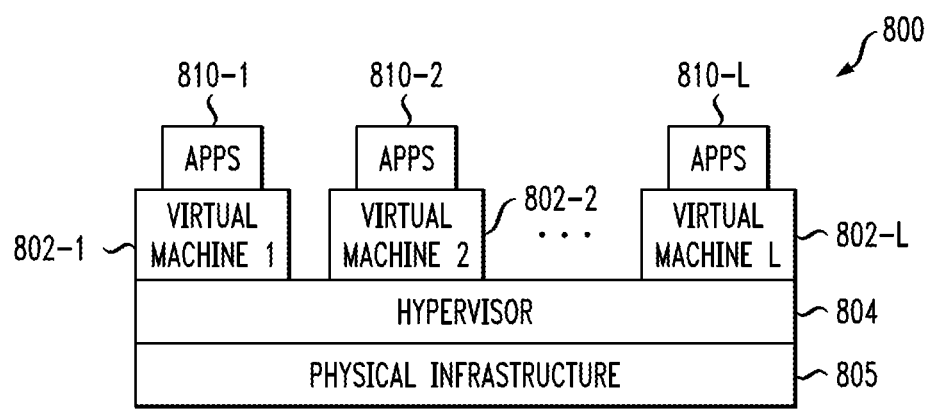
FIG. 8 illustrates an exemplary processing platform that may be used to implement at least a portion of one or more embodiments of the disclosure comprising a cloud infrastructure.

Referring now to FIG. 8, one possible processing platform that may be used to implement at least a portion of one or more embodiments of the disclosure comprises cloud infrastructure 800. The cloud infrastructure 800 in this exemplary processing platform comprises virtual machines (VMs) 802-1, 802-2, . . . 802-L implemented using a hypervisor 804. The hypervisor 804 runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor 804.

The cloud infrastructure 800 may encompass the entire given system or only portions of that given system, such as one or more of clients, servers, controllers, or computing devices in the system.

Although only a single hypervisor 804 is shown in the embodiment of FIG. 8, the system may of course include multiple hypervisors each providing a set of virtual machines using at least one underlying physical machine. Different sets of virtual machines provided by one or more hypervisors may be utilized in configuring multiple instances of various components of the system. An example of a commercially available hypervisor platform that may be used to implement hypervisor 804 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based snapshot engine 200 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based snapshot apparatus may each run on a computer, server, storage device or other processing platform element. A given such element may be viewed as an example of what is more generally referred to herein as a "processing device." The cloud infrastructure 800 shown in FIG. 8 may represent at least a portion of one processing platform.

Figure 9:
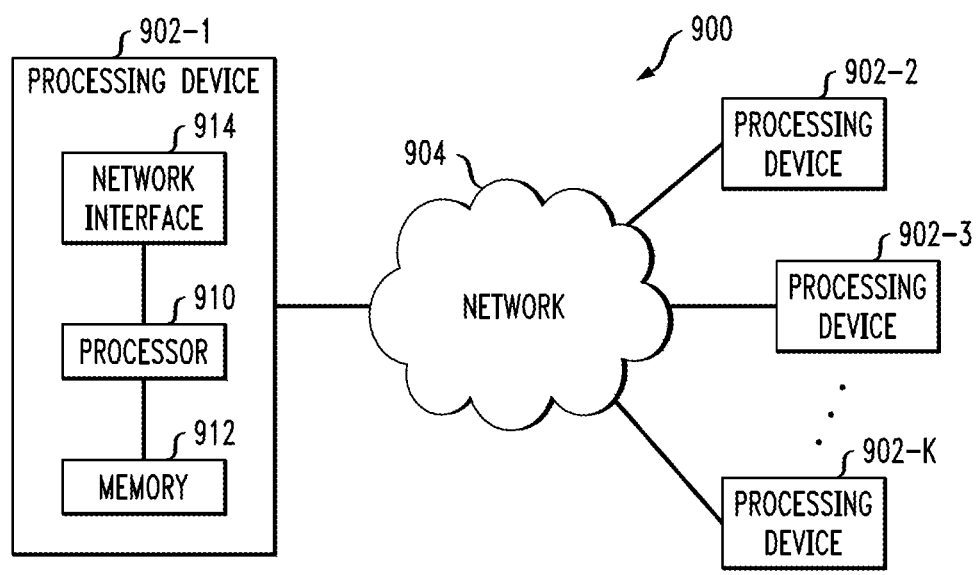
FIG. 9 illustrates another exemplary processing platform that may be used to implement at least a portion of one or more embodiments of the disclosure.

Another example of a processing platform is processing platform 900 shown in FIG. 9. The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 4 through 7, for example, are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and compute services platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for protection of at least one virtual machine, comprising:

obtaining, by at least one processing device of a data protection appliance, a plurality of snapshots of said at least one virtual machine, wherein each of said plurality of snapshots comprise (i) production data of said at least one virtual machine, (ii) a fine granularity data structure for changed data, wherein said fine granularity data structure is maintained in volatile memory and records metadata for input/output (I/O) operations corresponding to said changed data, and (iii) a coarse granularity bit map stored for changed data, wherein the coarse granularity bit map comprises a plurality of bits each indicating whether corresponding blocks of data have changed, wherein the coarse granularity bit has a granularity that is more coarse than the granularity of the fine granularity data structure, and wherein said data protection appliance is external to a production network comprising said virtual machine;

generating a metadata differential, by said at least one processing device of said data protection appliance, by aggregating: (i) the fine granularity data structures for any time intervals since a prior snapshot that were flushed to at least one storage volume and included in said prior snapshot, and (ii) the coarse granularity bit maps since the prior snapshot; and replicating said at least one storage volume using said metadata differential.

2. The method of claim 1, wherein said coarse granularity bit map and said fine granularity data structure are generated by a Change Block Tracking driver executing on a guest operating system on said production network.

3. The method of claim 1, wherein said data protection appliance obtains said plurality of snapshots for a plurality of said virtual machines.

4. The method of claim 1, wherein said metadata comprises an offset and a length for each of said I/O operations.

5. The method of claim 1, wherein said step of generating a metadata differential further comprises the step of obtaining, from a subsequent snapshot, said fine granularity data structures for said time intervals since said prior snapshot that were not flushed to said at least one storage volume and included in said prior snapshot.

6. The method of claim 1, wherein said step of replicating said at least one storage volume using said metadata differential further comprises the step of using said metadata differential to read said changed data from a subsequent snapshot.

7. The method of claim 1, wherein said step of obtaining said plurality of snapshots of said at least one virtual machine is performed using a snapshot mechanism provided by a cloud service where said at least one virtual machine executes.

8. The method of claim 1, further comprising the step of flushing said fine granularity data structure after a predefined flush interval.

9. A system for protection of at least one virtual machine, comprising:

a memory; and at least one processing device, coupled to the memory, operative to implement the following steps:

obtaining, by at least one processing device of a data protection appliance, a plurality of snapshots of said at least one virtual machine, wherein each of said plurality of snapshots comprise (i) production data of said at least one virtual machine, (ii) a fine granularity data structure for changed data, wherein said fine granularity data structure is maintained in volatile memory and records metadata for input/output (I/O) operations corresponding to said changed data, and (iii) a coarse granularity bit map stored for changed data, wherein the coarse granularity bit map comprises a plurality of bits each indicating whether corresponding blocks of data have changed, wherein the coarse granularity bit has a granularity that is more coarse than the granularity of the fine granularity data structure, and wherein said data protection appliance is external to a production network comprising said virtual machine;

generating a metadata differential, by said at least one processing device of said data protection appliance, by aggregating: (i) the fine granularity data structures for any time intervals since a prior snapshot that were flushed to at least one storage volume and included in said prior snapshot, and (ii) the coarse granularity bit maps since the prior snapshot; and replicating said at least one storage volume using said metadata differential.

10. The system of claim 9, wherein said coarse granularity bit map and said fine granularity data structure are generated by a Change Block Tracking driver executing on a guest operating system on said production network.

11. The system of claim 9, wherein said data protection appliance obtains said plurality of snapshots for a plurality of said virtual machines.

12. The system of claim 9, wherein said metadata comprises an offset and a length for each of said I/O operations.

13. The system of claim 9, wherein said step of generating a metadata differential further comprises the step of obtaining, from a subsequent snapshot, said fine granularity data structures for said time intervals since said prior snapshot that were not flushed to said at least one storage volume and included in said prior snapshot.

14. The system of claim 9, wherein said step of replicating said at least one storage volume using said metadata differential further comprises the step of using said metadata differential to read said changed data from a subsequent snapshot.

15. The system of claim 9, wherein said step of obtaining said plurality of snapshots of said at least one virtual machine is performed using a snapshot mechanism provided by a cloud service where said at least one virtual machine executes.

16. The system of claim 9, further comprising the step of flushing said fine granularity data structure after a predefined flush interval.

17. A computer program product for protection of at least one virtual machine, comprising a non-transitory machine-readable storage medium having encoded therein executable code of one or more software programs, wherein the one or more software programs when executed by at least one processing device perform the following steps:

obtaining, by at least one processing device of a data protection appliance, a plurality of snapshots of said at least one virtual machine, wherein each of said plurality of snapshots comprise (i) production data of said at least one virtual machine, (ii) a fine granularity data structure for changed data, wherein said fine granularity data structure is maintained in volatile memory and records metadata for input/output (I/O) operations corresponding to said changed data, and (iii) a coarse granularity bit map stored for changed data, wherein the coarse granularity bit map comprises a plurality of bits each indicating whether corresponding blocks of data have changed, wherein the coarse granularity bit has a granularity that is more coarse than the granularity of the fine granularity data structure, and wherein said data protection appliance is external to a production network comprising said virtual machine;

generating a metadata differential, by said at least one processing device of said data protection appliance, by aggregating: (i) the fine granularity data structures for any time intervals since a prior snapshot that were flushed to at least one storage volume and included in said prior snapshot, and (ii) the coarse granularity bit maps since the prior snapshot; and replicating said at least one storage volume using said metadata differential.

18. The computer program product of claim 17, wherein said coarse granularity bit map and said fine granularity data structure are generated by a Change Block Tracking driver executing on a guest operating system on said production network.

19. The computer program product of claim 17, wherein said step of generating a metadata differential further comprises the step of obtaining, from a subsequent snapshot, said fine granularity data structures for said time intervals since said prior snapshot that were not flushed to said at least one storage volume and included in said prior snapshot.

20. The computer program product of claim 17, wherein said step of replicating said at least one storage volume using said metadata differential further comprises the step of using said metadata differential to read said changed data from a subsequent snapshot.

* * * * *